United States Patent
Miwa et al.

(10) Patent No.: US 9,522,670 B2
(45) Date of Patent: Dec. 20, 2016

(54) CONTROL SYSTEM OF HYBRID VEHICLE

(71) Applicant: TOYOTA JIDOSHA KABUSHIKI KAISHA, Toyota-shi, Aichi-ken (JP)

(72) Inventors: Koji Miwa, Susono (JP); Takashi Kawai, Gotemba (JP); Kenji Itagaki, Shizuoka-ken (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 56 days.

(21) Appl. No.: 14/692,208

(22) Filed: Apr. 21, 2015

(65) Prior Publication Data

US 2015/0307080 A1    Oct. 29, 2015

(30) Foreign Application Priority Data

Apr. 23, 2014   (JP) .................... 2014-089359

(51) Int. Cl.
  *B60W 10/06*   (2006.01)
  *B60W 10/08*   (2006.01)
  *B60W 20/00*   (2016.01)

(52) U.S. Cl.
  CPC ............. *B60W 20/10* (2013.01); *B60W 10/06* (2013.01); *B60W 10/08* (2013.01); *B60W 2510/244* (2013.01); *B60W 2530/00* (2013.01); *B60W 2710/0677* (2013.01); *B60W 2710/086* (2013.01); *Y10S 903/93* (2013.01)

(58) Field of Classification Search
  CPC ................. B60W 2710/086; B60W 2510/244; B60W 2530/00
  See application file for complete search history.

(56) References Cited

U.S. PATENT DOCUMENTS

2004/0123836 A1    7/2004   Nishigaki et al.

FOREIGN PATENT DOCUMENTS

| JP | H11-299004 A | 10/1999 |
|----|----|----|
| JP | 2004144041 A | 5/2004 |
| JP | 2011-240757 A | 12/2011 |
| JP | 2011-255824 A | 12/2011 |
| JP | 2012106672 A | 6/2012 |

*Primary Examiner* — Todd Melton
*Assistant Examiner* — Jason Roberson
(74) *Attorney, Agent, or Firm* — Andrews Kurth Kenyon LLP

(57) ABSTRACT

A control system is provided in a vehicle including an internal combustion engine, a second MG, and a first MG. The control system starts the engine when required vehicle output becomes equal to or larger than a predetermined start threshold value, and stops the engine when the required vehicle output becomes equal to or smaller than a predetermined stop threshold value. The control system controls the engine so that output power equal to or larger than a predetermined output lower-limit value is generated, during a period from the time when the required vehicle output becomes equal to or larger than the predetermined start threshold value to the time when the required vehicle output becomes equal to or lower than the predetermined stop threshold value. The predetermined output lower-limit value is set to the predetermined start threshold value used when the required vehicle output becomes equal to or larger than the predetermined start threshold value.

5 Claims, 10 Drawing Sheets

CONTROL SYSTEM OF HYBRID VEHICLE

INCORPORATION BY REFERENCE

The disclosure of Japanese Patent Application No. 2014-089359 filed on Apr. 23, 2014 including the specification, drawings and abstract is incorporated herein by reference in its entirety.

BACKGROUND OF THE INVENTION

1. Field of the Invention

The invention relates to a control system for use in a hybrid vehicle including an internal combustion engine and at least one motor-generator as power sources for running the vehicle. More particularly, the invention relates to a control system that starts the internal combustion engine when required vehicle output (or required vehicle output power) becomes equal to or larger than a given start threshold value, and stops the engine when the required vehicle output becomes equal to or smaller than a given stop threshold value.

2. Description of Related Art

A hybrid vehicle including an internal combustion engine and at least one motor-generator as power sources for running the vehicle is known. In a known example of this type of hybrid vehicle, the internal combustion engine is started when the required vehicle output becomes equal to or larger than a given start threshold value, so that the vehicle runs mainly with power of the engine, and the engine is stopped when the required vehicle output becomes equal to or smaller than a given stop threshold value, so that the vehicle runs with power of the motor-generator. Also, during running of the vehicle with power of the internal combustion engine, if the state of charge of a battery is less than a given value, and power required to be generated from the engine is smaller than a given power, the engine is controlled so that power obtained by adding additional or extra power calculated based on the voltage across terminals of the battery to the power required of the engine is generated from the engine (see Japanese Patent Application Publication No. 2011-240757 (JP 2011-240757 A)). Other examples of the above type of hybrid vehicle are described in Japanese Patent Application Publication No. 11-299004 (JP 11-299004 A) and Japanese Patent Application Publication No. 2011-255824 (JP 2011-255824 A).

In the control as described in JP 2011-240757 A, even when a difference between the power required of the engine and the given power is larger than the additional power, the output power of the engine is increased only by the amount of the additional power. Therefore, in this case, the engine may be operated in an operating region having poor operating efficiency.

SUMMARY OF THE INVENTION

In view of the above-described problem, the invention provides a control system of a hybrid vehicle, which system is able to improve the thermal efficiency of an internal combustion engine so as to improve the fuel economy.

According to one aspect of the invention, a control system is provided for use in a hybrid vehicle including an internal combustion engine and a motor-generator as power sources for running the vehicle, and the motor-generator or a generator connected to an output shaft of the internal combustion engine such that power of the motor-generator or the generator can be transmitted to the output shaft. The control system includes a controller. The controller is configured to start the internal combustion engine when required vehicle output as output power required of the vehicle becomes equal to or larger than a predetermined start threshold value. The controller is configured to stop the internal combustion engine when the required vehicle output becomes equal to or smaller than a predetermined stop threshold value that is smaller than the predetermined start threshold value. The controller is configured to cause the internal combustion engine to generate output power that is equal to or larger than a predetermined output lower-limit value from the internal combustion engine, during a period from a time when the required vehicle output becomes equal to or larger than the predetermined start threshold value, to a time when the required vehicle output becomes equal to or smaller than the predetermined stop threshold value. The predetermined output lower-limit value is output power that is larger than the predetermined stop threshold value.

According to the control system of the vehicle of the invention, during the period from the time when the required vehicle output becomes equal to or larger than the predetermined start threshold value to the time when the required vehicle output becomes equal to or smaller than the predetermined stop threshold value, the internal combustion engine is controlled so as to generate output power that is equal to or larger than the predetermined output lower-limit value. Therefore, if the predetermined output lower-limit value is set to an appropriate value, the internal combustion engine is prevented from being operated in an operating region in which the output power is low and the thermal efficiency is deteriorated. Thus, the thermal efficiency of the internal combustion engine can be improved, and the fuel economy can be improved.

In the control system as described above, the controller may be configured to set the predetermined output lower-limit value, based on the predetermined start threshold value used when the required vehicle output becomes equal to or larger than the predetermined start threshold value. Also, in the control system as described above, the controller may be configured to set the predetermined output lower-limit value to the predetermined start threshold value used when the required vehicle output becomes equal to or larger than the predetermined start threshold value. Generally, the predetermined start threshold value is set to output power that is determined so that the internal combustion engine can be operated in an operating region having high thermal efficiency if the engine is operated to generate output power equal to or larger than the predetermined start threshold value. Therefore, if the predetermined output lower-limit value is set in this manner, the engine is prevented from being operated in an operating region having poor thermal efficiency.

Also, in the control system of the vehicle as described above, the controller may be configured to cause the internal combustion engine to generate the power that becomes substantially equal to the predetermined output lower-limit value when the required vehicle output is smaller than the predetermined start threshold value, during the period from the time when the required vehicle output becomes equal to or larger than the predetermined start threshold value, to the time when the required vehicle output becomes equal to or smaller than the predetermined stop threshold value. By controlling the internal combustion engine in this manner, it is possible to make the output power of the engine close to the required vehicle output while operating the engine in an operating region having high thermal efficiency.

Also, in the control system of the vehicle as described above, the controller may be configured to control the motor-generator or the generator to consume output power for power generation by the motor-generator or the generator so as to charge a battery, the consumed output power corresponding to a difference between the required vehicle output and the predetermined output lower-limit value, when the controller causes the internal combustion engine to generate the output power that becomes substantially equal to the predetermined output lower-limit value and the required vehicle output is smaller than the predetermined start threshold value, during the period from the time when the required vehicle output becomes equal to or larger than the predetermined start threshold value, to the time when the required vehicle output becomes equal to or smaller than the predetermined stop threshold value. With the motor-generator or the generator controlled in the above manner, the consumed output power corresponding to a difference between the required vehicle output and the predetermined output lower-limit value can be stored as electric energy in the battery.

Also, in the control system of the vehicle as described above, the controller may be configured to, when the required vehicle output is smaller than the predetermined start threshold value and a length of time over which the internal combustion engine is continuously operated so as to generate output power becomes equal to or longer than a predetermined criterial time, the output power being equal to or larger than the predetermined output lower-limit value, i) inhibit the controller from causing the internal combustion engine to generate output power that is equal to or larger than the predetermined output lower-limit value from the internal combustion engine, during the period from the time when the required vehicle output becomes equal to or larger than the predetermined start threshold value, to the time when the required vehicle output becomes equal to or smaller than the predetermined stop threshold value, and ii) control the internal combustion engine so as to operate the internal combustion engine based on the required vehicle output. As known in the art, if the battery is continuously charged for a long time, deterioration of the battery is accelerated. Therefore, if the controller is inhibited from controlling the engine in the above manner, deterioration of the battery can be suppressed. Accordingly, the battery life can be prolonged.

Also, in the control system of the vehicle as described above, the controller may be configured to, when the required vehicle output is smaller than the predetermined start threshold value and an integrated value of an amount of electric power with which the battery is charged becomes equal to or larger than a predetermined criterial amount of charge while the internal combustion engine is operated so as to generate output power that is equal to or larger than the predetermined output lower-limit value, i) inhibit the controller from causing the internal combustion engine to generate output power that is equal to or larger than the predetermined output lower-limit value from the internal combustion engine, during the period from the time when the required vehicle output becomes equal to or larger than the predetermined start threshold value, to the time when the required vehicle output becomes equal to or smaller than the predetermined stop threshold value, and ii) control the internal combustion engine so as to operate the internal combustion engine based on the required vehicle output. As known in the art, if the battery is excessively charged, deterioration of the battery is accelerated. Therefore, if the controller is inhibited from controlling the engine in the above manner, deterioration of the battery can be suppressed. Accordingly, the battery life can be prolonged.

With the control system of the vehicle configured according to the invention, the internal combustion engine is controlled so as to generate output power that is equal to or larger than the predetermined output lower-limit value, during the period from the time when the required vehicle output becomes equal to or larger than the predetermined start threshold value, to the time when the required vehicle output becomes equal to or smaller than the predetermined stop threshold value. Therefore, if the predetermined output lower-limit value is appropriately set, the thermal efficiency of the engine can be improved, and the fuel economy can be thus improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
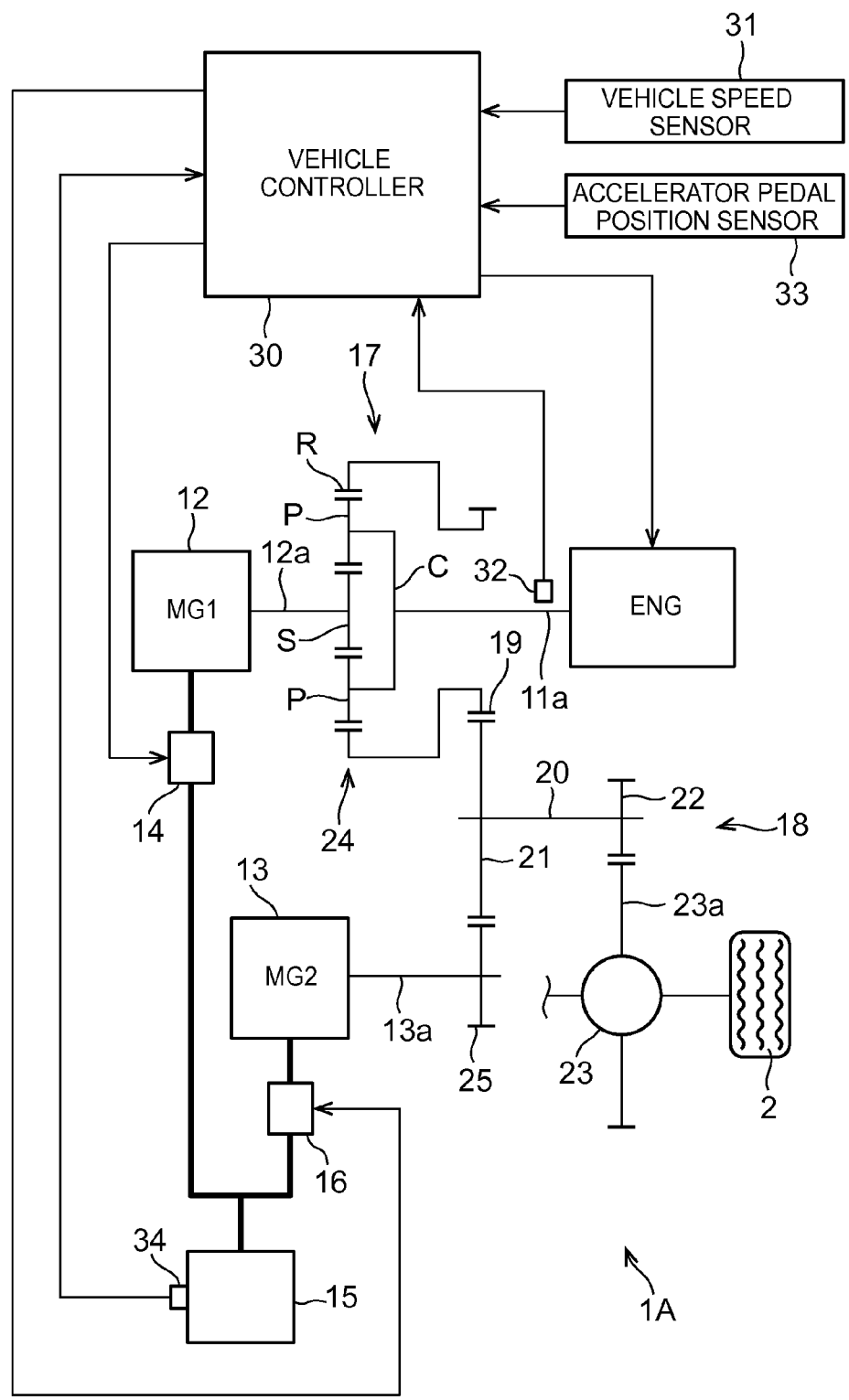
FIG. 1 is a view schematically showing a hybrid vehicle in which a control system according to a first embodiment of the invention is incorporated.

A hybrid vehicle in which a control system according to a first embodiment of the invention is incorporated is schematically illustrated in FIG. 1. The vehicle 1A includes an internal combustion engine (which may be called "engine") 11, a first motor-generator (which may be abbreviated to "first MG") 12, and a second motor-generation (which may be abbreviated to "second MG") 13. The engine 11 is a known spark ignition internal combustion engine having a plurality of cylinders. The first MG 12 and the second MG 13 are known motor-generators installed on the hybrid vehicle and functioning as electric motors and generators. Therefore, detailed description of the engine 1, first MG 12 and the second MG 13 will not be provided. The first MG 12 is electrically connected to a battery 15 via an inverter 14. The second MG 13 is electrically connected to the battery 15 via an inverter 16.

A crankshaft 11a as an output shaft of the engine 11 and an output shaft 12a of the first MG 12 are connected to a power split device 17. An output unit 18 for transmitting power to drive wheels 2 of the vehicle 1A is also connected to the power split device 17. The output unit 18 includes a first drive gear 19, a counter gear 21 that meshes with the first drive gear 19 and is fixed to a counter shaft 20, and an output gear 22 fixed to the counter shaft 20. The output gear 22 meshes with a ring gear 23a provided in a case of a differential mechanism 23. The differential mechanism 23 is a known mechanism that distributes power transmitted to the ring gear 23a to the right and left drive wheels 2. In FIG. 1, only one of the right and left drive wheels 2 is shown.

The power split device 17 includes a planetary gear train 24 as a differential mechanism. The planetary gear train 24 is a single-pinion-type planetary gear train, and includes a sun gear S, a ring gear R, a pinion P, and a carrier C. The sun gear S is an externally toothed gear. The ring gear R is an internally toothed gear disposed coaxially with the sun gear S. The pinion P meshes with the sun gear S and the ring gear R. The carrier C holds the pinion P such that the pinion P can rotate about itself and rotate about the sun gear S. The sun gear S is coupled to the output shaft 12a of the first MG 12. The carrier C is coupled to the crankshaft 11a as the output shaft of the engine 11. The ring gear R is coupled to the first drive gear 19.

A second drive gear 25 is provided on an output shaft 13a of the second MG 13. The second drive gear 25 meshes with the counter gear 21.

The operation of the engine 11, first MG 12, and the second MG 13 is controlled by a vehicle controller 30. The vehicle controller 30 is configured as a computer unit including a microprocessor and peripheral equipment, such as RAM, and ROM, needed for operation of the microprocessor. The vehicle controller 30 stores various control programs for appropriately running the vehicle 1A. The vehicle controller 30 performs control on control objects, such as the engine 11 and the first and second MGs 12, 13, by executing these programs. The vehicle controller 30 controls the inverters 14, 16, thereby to control the first and second MGs 12, 13, respectively. Various sensors for obtaining information concerning the vehicle 1A are connected to the vehicle controller 30. For example, a vehicle speed sensor 31, crank angle sensor 32, accelerator pedal position sensor 33, and an SOC sensor 34 are connected to the vehicle controller 30. The vehicle speed sensor 31 outputs a signal corresponding to the speed of the vehicle 1A (vehicle speed). The crank angle sensor 32 outputs a signal corresponding to the number of revolutions of the crankshaft 11a as the output shaft of the engine 11. The accelerator pedal position sensor 33 outputs a signal corresponding to the accelerator pedal stroke indicative of the amount of depression of the accelerator pedal. The SOC sensor 34 outputs a signal corresponding to the state of charge of the battery 15. In the following description, the state of charge may be called "SOC". Various other sensors are connected to the vehicle controller 30, but are not illustrated in FIG. 1.

Next, control performed by the vehicle controller 30 will be described. When the vehicle 1A is decelerated, the vehicle controller 30 causes the second MG 13 to function as a generator and generate electric power through regenerative braking, so as to recover energy. The vehicle 1A has two or more running modes, and the vehicle controller 30 selects one from these running modes, according to output power Pv required to be generated from the vehicle 1A. The output power Pv required of the vehicle 1A may be called "required vehicle output power" or "required vehicle output". The required vehicle output Pv is obtained by adding power required for charging the battery 15, to output power (driver-requested power) requested by the driver to be generated from the vehicle 1A. The above-indicated two or more running modes include, for example, an EV (Electric Vehicle) mode and an HV (Hybrid Vehicle) mode. The EV mode is a running mode in which the drive wheels 2 are driven only by the second MG 13. Therefore, the required vehicle output Pv is generated from the second MG 13. The HV mode is a running mode in which the drive wheels 2 are driven mainly by the engine 11. In the HV mode, however, when the output power of the engine 11 is insufficient relative to the required vehicle output Pv, the second MG 13 assists driving of the drive wheels 2. Namely, when the output power of the engine 11 is not insufficient (i.e., is sufficient), the required vehicle output Pv is generated from the engine 11. Also, in the HV mode, the first MG 12 functions as a generator as needed. Namely, the first MG 12 is driven with a part of the output power of the engine 11 so as to generate electric power.

When the required vehicle output Pv becomes equal to or larger than a predetermined start threshold value Psta, the vehicle controller 30 starts the engine 11, and switches the running mode to the HV mode. On the other hand, when the required vehicle output Pv becomes equal to or smaller than a predetermined stop threshold value Pstp, the vehicle controller 30 stops the engine 11, and switches the running mode to the EV mode. The start threshold value Psta is set to such a value that, if the engine 11 is operated so as to generate power equal to or larger than the start threshold value Psta, the engine 11 can operate in an operating region having high thermal efficiency. The stop threshold value Pstp is set to a value that is smaller than the start threshold value Psta. Thus, the start threshold value Psta and the stop threshold value Pstp are set to different values, so that the frequency of start and stop of the engine 11 is reduced.

The vehicle controller 30 sets an output lower-limit value PL to the start threshold value Psta used when the required vehicle output Pv becomes equal to or larger than the start threshold value Psta. Then, during a period from the time when the required vehicle output Pv becomes equal to or larger than the start threshold value Psta to the time when the required vehicle output Pv becomes equal to or smaller than the stop threshold value Pstp, namely while the vehicle is running in the HV mode, the engine 11 is controlled to be operated to generate power equal to or larger than the thus set output lower-limit value PL. More specifically, the vehicle controller 30 controls the engine 11 so that the output of the engine 11 becomes equal to the output lower-limit value PL when the required vehicle output Pv is smaller than the start threshold value Psta (=output lower-limit value PL). When the engine 11 is controlled in this manner, power that is larger than the required vehicle output Pv is generated from the engine 11. In this case, the vehicle controller 30 causes the first MG 12 to function as a generator, and generate electric power using excess power. The electric power thus generated is used for charging the battery 15.

Figure 2:
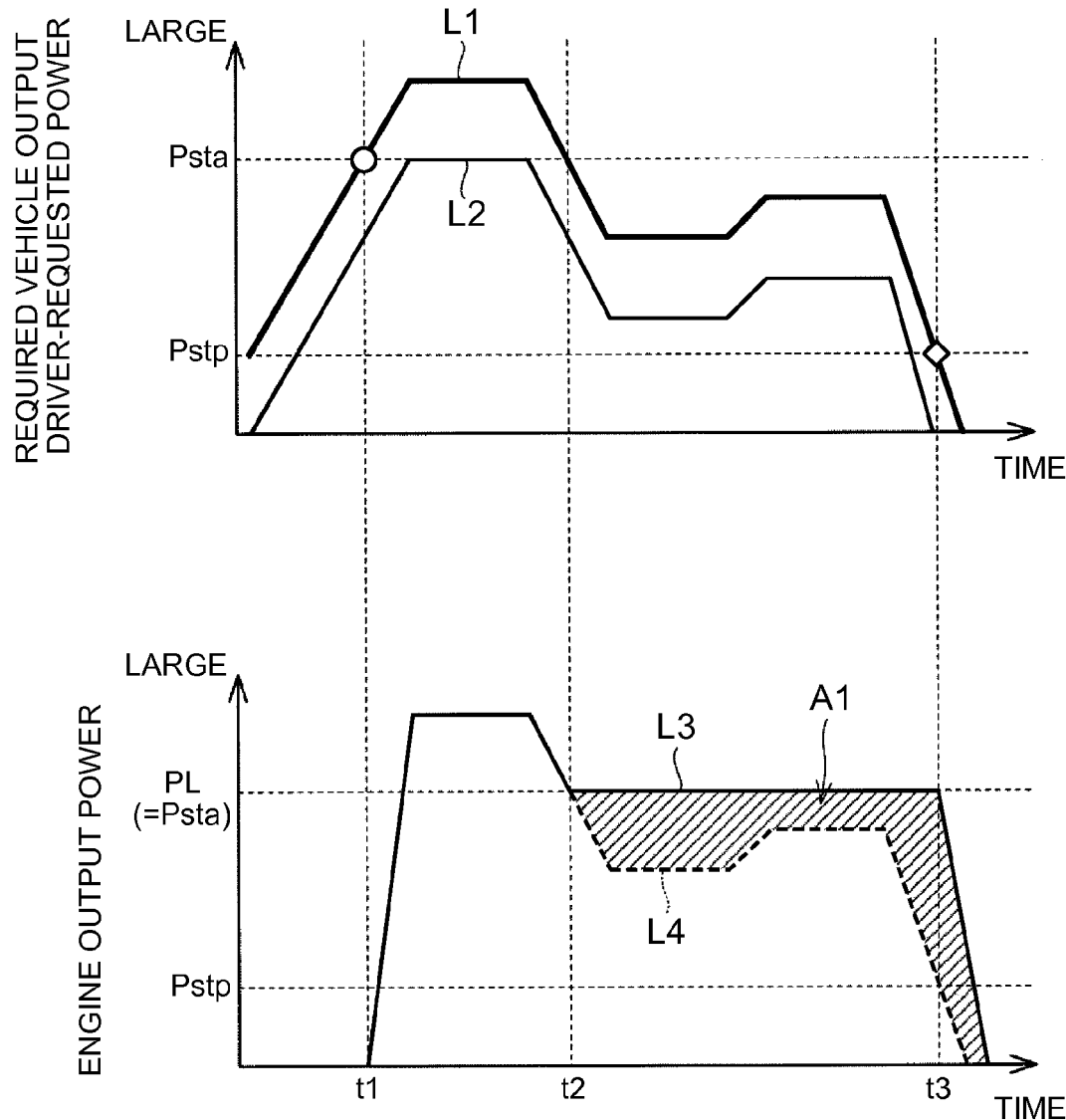
FIG. 2 is a view showing one example of changes of required vehicle output, driver-requested power, and output power of an engine with time in the first embodiment.

Referring to FIG. 2, the above-described controls will be specifically described. The upper graph in FIG. 2 shows one example of changes of the required vehicle output Pv and the driver-requested power with time. In this graph, solid line L1 indicates changes of the required vehicle output Pv with time, and solid line L2 indicates changes of the driver-requested power with time. As described above, the required vehicle output Pv is a value obtained by adding power required for charging the battery 15 to the driver-requested power. In the example shown in FIG. 2, the battery 15 needs to be charged, and therefore, the required vehicle output Pv is larger than the driver-requested power. In FIG. 2, a difference between the required vehicle output Pv and the driver-requested power is power required for charging the battery 15. The lower graph in FIG. 2 shows one example of changes of the output power of the engine 11 with time. In this graph, solid line L3 indicates changes of the output power of the engine 11 with time when the engine 11 is controlled in the manner as described above. In this graph, broken line L4 indicates changes of the output power of the engine 11 with time when the engine 11 is controlled so that power of the required vehicle output Pv is generated from the engine 11, as a comparative example.

In the example shown in FIG. 2, the required vehicle output Pv becomes equal to or larger than the start threshold value Psta at time t1. Therefore, the engine 11 is started. Also, the running mode is switched to the HV mode. Then, the engine 11 is controlled so that the required vehicle output Pv is generated from the engine 11. Thereafter, when the required vehicle output Pv becomes smaller than the start threshold value Psta at time t2, the engine 11 is controlled so that power of the output lower-limit value PL is generated from the engine 11. Then, when the required vehicle output Pv becomes equal to or smaller than the stop threshold value Pstp at time t3, the engine 11 is stopped. Then, the running mode is switched to the EV mode. With the vehicle thus controlled, power denoted by a hatched region A1 is generated as excess power, relative to power of the comparative example as indicated by the broken line L4. As described above, the excess power is used for generating electric power, with which the battery 15 is charged.

Figure 3:
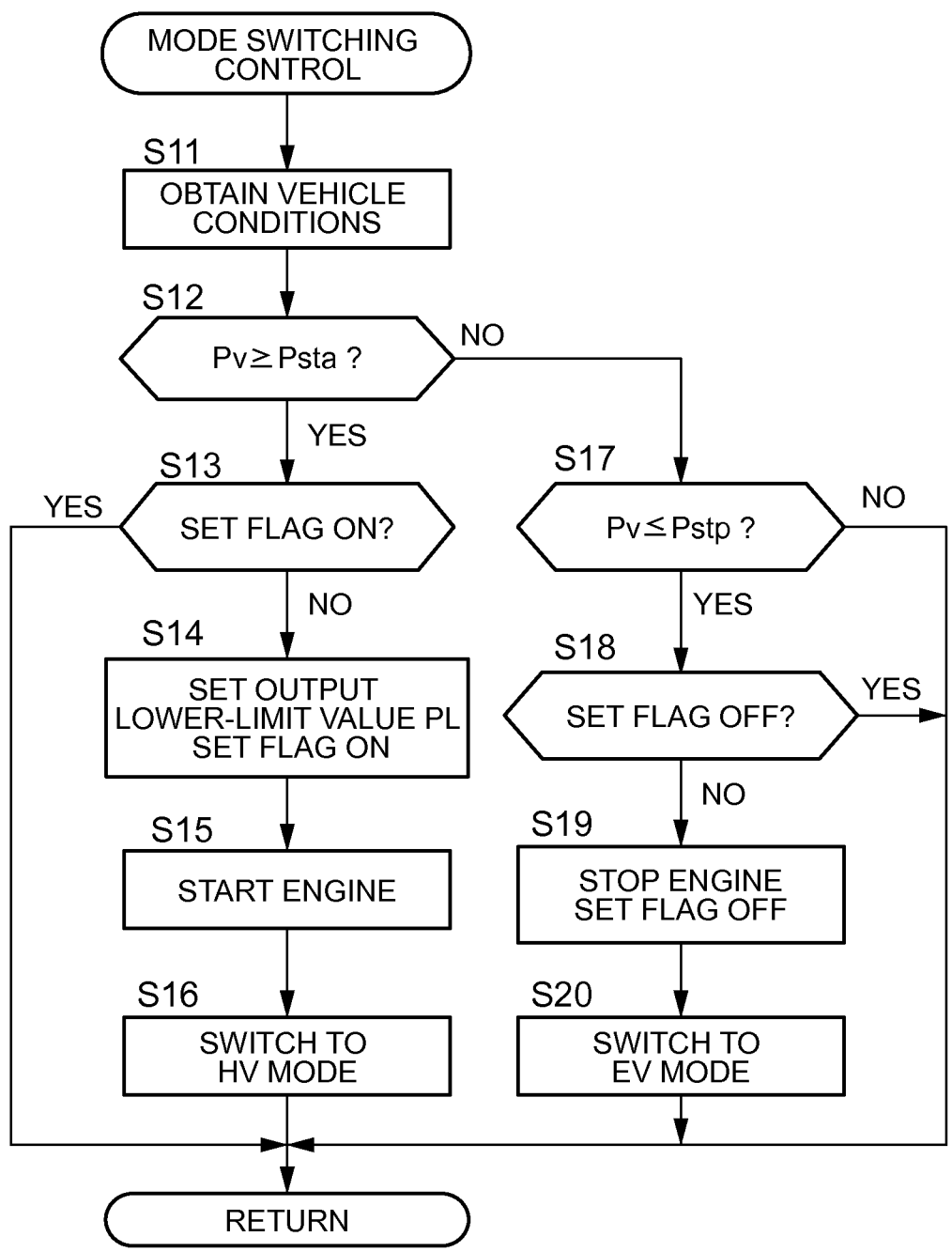
FIG. 3 is a flowchart illustrating a mode switching control routine executed by a vehicle controller of the control system according to the first embodiment.
Figure 4:
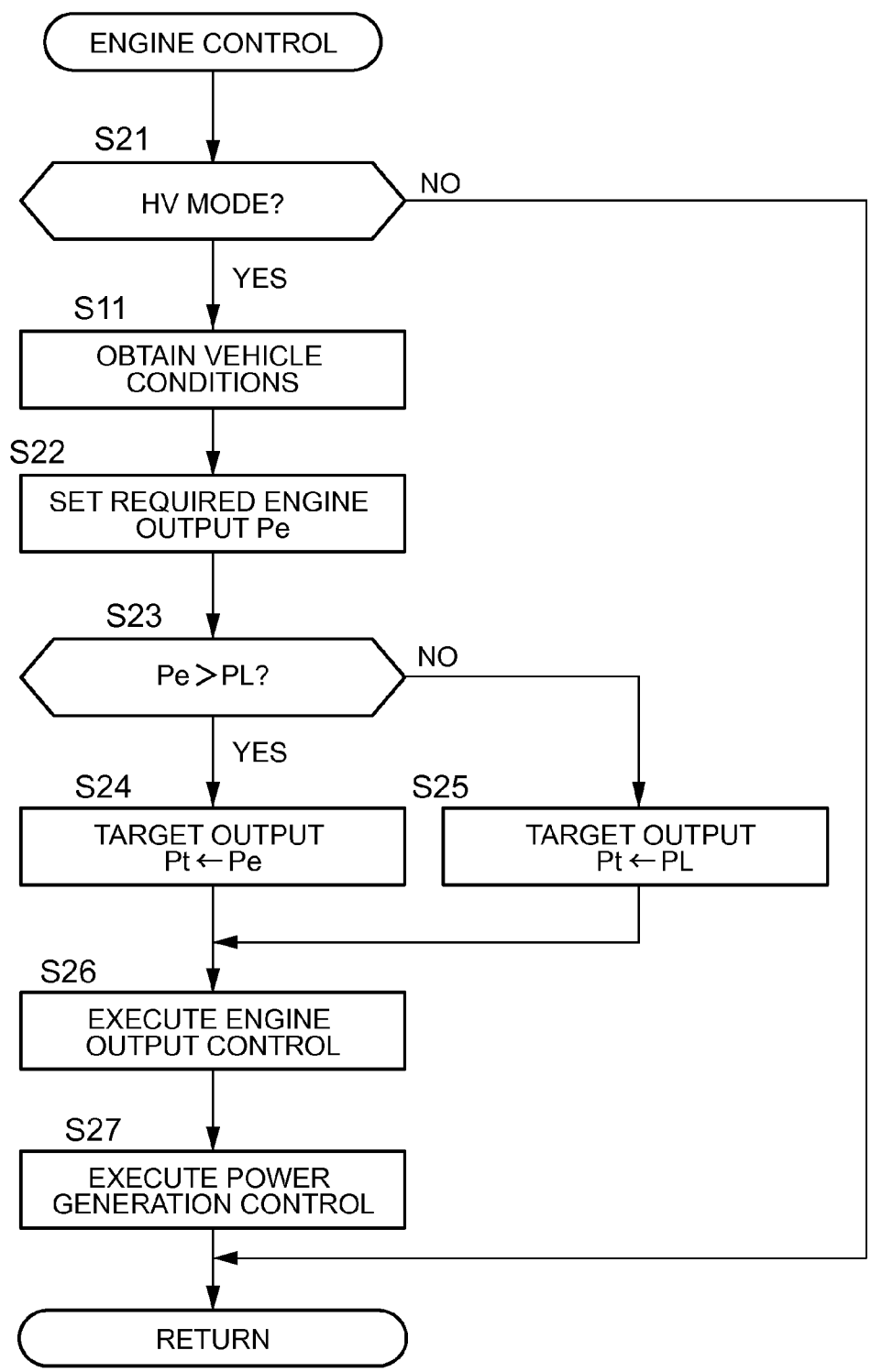
FIG. 4 is a flowchart illustrating an engine control routine executed by the vehicle controller.

FIG. 3 and FIG. 4 show control routines executed by the vehicle controller 30 so as to implement the controls as described above. FIG. 3 shows a mode switching control routine executed by the vehicle controller 30 so as to switch the running mode of the vehicle 1A. FIG. 4 is an engine control routine executed by the vehicle controller 30 so as to control the engine 11 when the vehicle is running in the HV mode. These control routines are repeatedly executed at given intervals during running of the vehicle 1A.

Initially, the control routine of FIG. 3 will be described. In the control routine, the vehicle controller 30 initially obtains conditions of the vehicle 1A in step S11. The conditions of the vehicle 1A obtained in step S11 include, for example, the vehicle speed, the number of revolutions of the engine 11, the accelerator pedal stroke (or the amount of operation of the accelerator pedal), the state of charge of the battery 15, and so forth. In this step, the driver-requested power is calculated based on the accelerator pedal stroke. Also, it is determined whether the battery 15 needs to be charged, based on the state of charge of the battery 15. If the battery 15 needs to be charged, the required power needed for charging the battery 15 is calculated according to the state of charge. Both of the driver-requested power and the power required for charging may be calculated by known calculation methods, and therefore, will not be described in detail. Then, the required vehicle output Pv is calculated from the driver-requested power and the power required for charging thus calculated.

In the next step S12, the vehicle controller 30 determines whether the required vehicle output Pv is equal to or larger than the start threshold value Psta. If it is determined that the required vehicle output Pv is equal to or larger than the start threshold value Psta, the control proceeds to step S13, and the vehicle controller 30 determines whether a set flag that indicates that the output lower-limit value PL has been set is ON. If it is determined that the set flag is ON, the current cycle of the control routine ends. If, on the other hand, it is determined that the set flag is OFF, the control proceeds to step S14, in which the vehicle controller 30 sets the output lower-limit value PL. As described above, the output lower-limit value PL is set to the start threshold value Psta used when the required vehicle output Pv becomes equal to or larger than the start threshold value Psta. Also, in this step, the vehicle controller 30 switches the set flag to ON. In the following step S15, the vehicle controller 30 starts the engine 11. In the next step S16, the vehicle controller 30 switches the running mode of the vehicle 1A to the HV mode. If the running mode is already the HV mode, the vehicle is kept running in the HV mode. Then, the current cycle of the control routine of FIG. 3 ends.

If, on the other hand, it is determined in step S12 that the required vehicle output Pv is smaller than the start threshold value Psta, the control proceeds to step S17, and the vehicle controller 30 determines whether the required vehicle output Pv is equal to or smaller than the stop threshold value Pstp. If it is determined that the required vehicle output Pv is larger than the stop threshold value Pstp, this cycle of the control routine ends. If, on the other hand, it is determined that the required vehicle output Pv is equal to or smaller than the stop threshold value Pstp, the control proceeds to step S18, in which the vehicle controller 30 determines whether the set flag is OFF. If it is determined that the set flag is OFF, the current cycle of this routine ends. If, on the other hand, it is determined that the set flag is ON, the control proceeds to step S19, in which the vehicle controller 30 stops the engine 11. If the engine 11 is already stopped, this condition is maintained. Also, in this step, the vehicle controller 30 switches the set flag to OFF. In the next step S20, the vehicle controller 30 switches the running mode of the vehicle 1A to the EV mode. If the running mode is already the EV mode, the vehicle is kept running in the EV mode. Then, the current cycle of the control routine of FIG. 3 ends.

Next, the control routine of FIG. 4 will be described. In FIG. 4, the same reference numerals are assigned to portions or blocks in common with FIG. 3. In the control routine of FIG. 4, the vehicle controller 30 initially determines in step S21 whether the running mode of the vehicle 1A is the HV mode. If it is determined that the running mode is the EV mode (namely, it is not the HV mode), the current cycle of the control routine ends. If, on the other hand, the running mode is the HV mode, the control proceeds to step S11, in which the vehicle controller 30 obtains conditions of the vehicle 1A. In the next step S22, the vehicle controller 30 sets the required engine output Pe. If the output power of the engine 11 is insufficient relative to the required vehicle output Pv, the required engine output Pe is set to the maximum value of power that can be generated from the engine 11. If, on the other hand, the engine 11 is able to generate the required vehicle output Pv, the required engine output Pe is set to the required vehicle output Pv. In the following step S23, the vehicle controller 30 determines whether the required engine output Pe is larger than the output lower-limit value PL. If it is determined that the required engine output Pe is larger than the output lower-limit value PL, the control proceeds to step S24, in which the vehicle controller 30 sets a target output Pt to be generated from the engine 11, to the required engine output Pe. If, on the other hand, it is determined that the required engine output Pe is equal to or lower than the output lower-limit value PL, the control proceeds to step S25, in which the vehicle controller 30 sets the target output Pt to the output lower-limit value PL.

After the target output Pt is set in step S24 or step S25, the control proceeds to step S26, in which the vehicle controller 30 performs engine output control. In the engine output control, the engine 11 is controlled so that the target output Pt set in the above manner is generated from the engine 11. In the next step S27, the vehicle controller 30 performs power generation control. In the power generation control, the amount of electric power generated by the first MG 12 is controlled so that power obtained by subtracting the driver-requested power from the target output Pt is consumed through power generation. If the power obtained by subtracting the driver-requested power from the target output Pt is equal to or smaller than zero, the amount of electric power generated is made equal to zero. Then, the current cycle of the control routine of FIG. 4 ends.

As described above, in the first embodiment, when the required engine output Pe is equal to or smaller than the output lower-limit value PL in the HV mode, the target output Pt is set to the output lower-limit value PL. Namely, the engine 11 is controlled so as to generate power that is equal to or larger than the output lower-limit value PL. Therefore, it is possible to prevent the engine 11 from being operated in an operating region in which the output (power level) is low and the thermal efficiency is deteriorated. Thus, the thermal efficiency of the engine 11 can be improved, and the fuel economy can be thus improved. Also, in the first embodiment, when the required engine output Pe is equal to or smaller than the output lower-limit value PL, the target output Pt is set to the output lower-limit value PL; therefore, the driver is less likely or unlikely to feel uncomfortable or strange.

Figure 5:
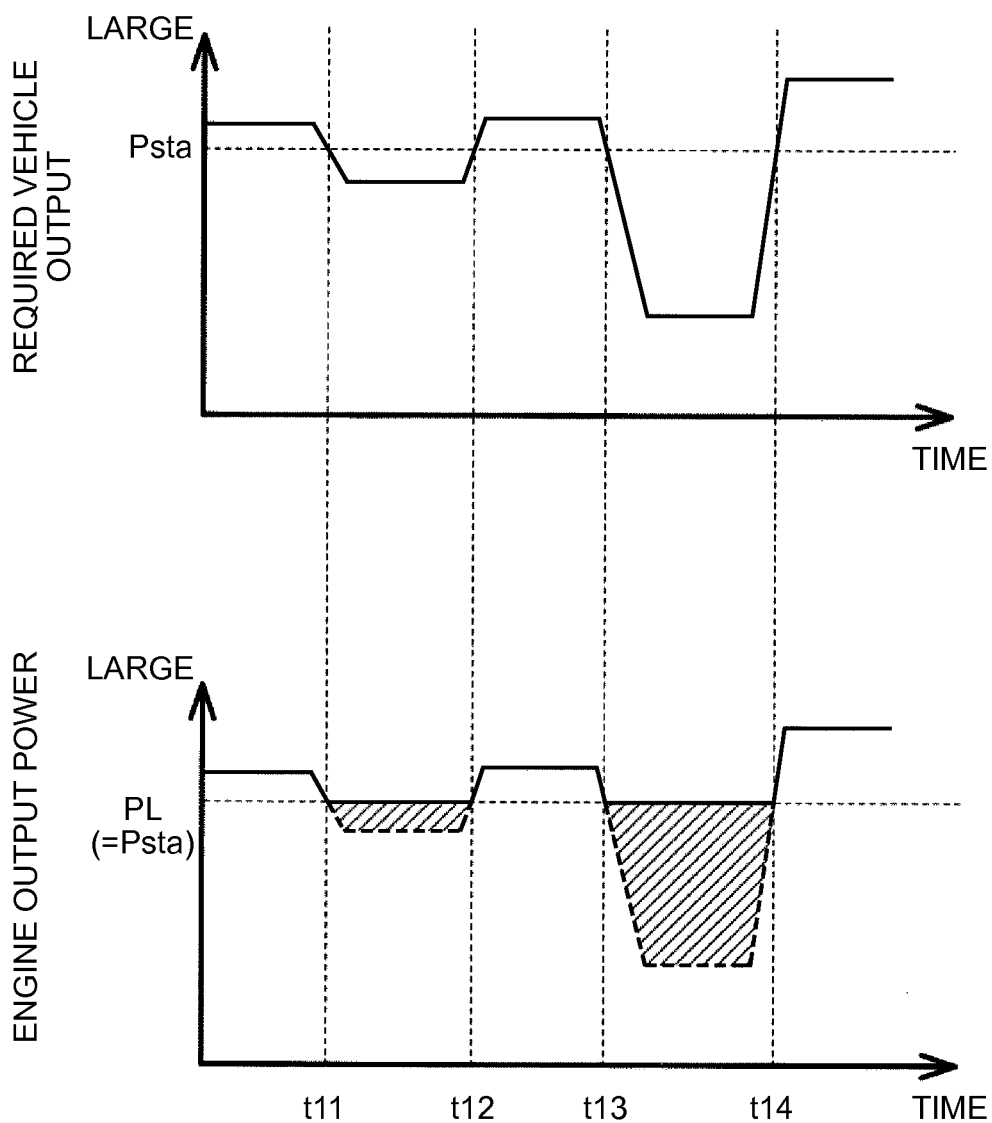
FIG. 5 is a view showing one example of changes of required vehicle output and output power of the engine with time when the engine is controlled according to the engine control routine of FIG. 4.
Figure 6:
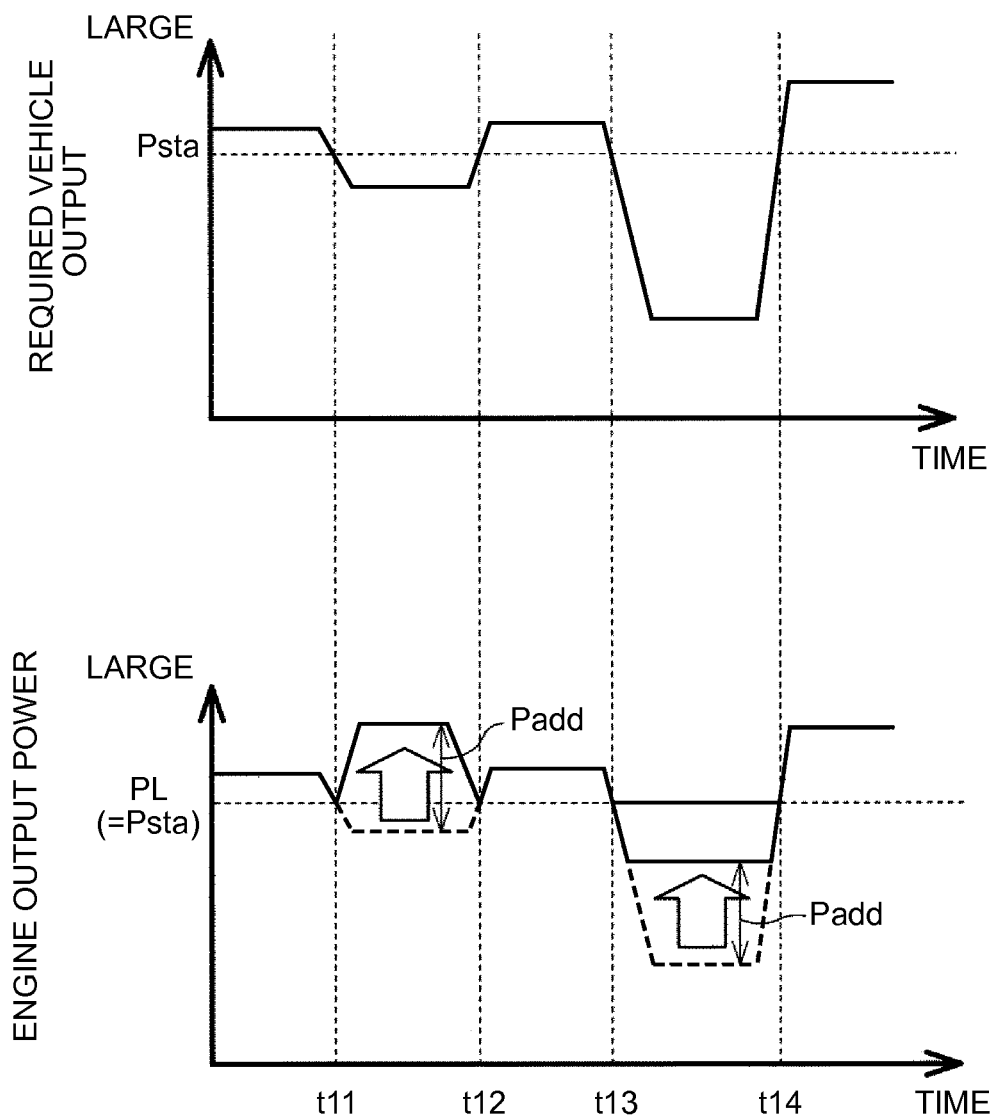
FIG. 6 is a view showing one example of changes of required vehicle output and output power of the engine with time as a comparative example when the engine is controlled such that a predetermined additional power is added to required engine output when the required engine output is equal to or smaller than an output lower-limit value.

Referring to FIG. 5 and FIG. 6, the operation and effect of the first embodiment will be described. FIG. 5 shows one example of changes of the required vehicle output Pv and the output power of the engine 11 with time when the engine 11 is controlled according to the control routine of FIG. 4 as described above. FIG. 6 shows one example of changes of the required vehicle output Pv and the output power of the engine 11 with time when the engine 11 is controlled according to a control scheme (which may be called "control scheme of a comparative example") in which a given additional or extra power Padd is added to the required engine output Pe when the required engine output Pe is equal to or smaller than the output lower-limit value PL. It is to be noted that, in FIG. 5 and FIG. 6, the required vehicle output Pv varies with time in the same fashion. Namely, the upper graph of FIG. 5 is identical with that of FIG. 6. The same reference numerals are assigned to common portions in FIG. 5 and FIG. 6. In the examples shown in these figures, the driver requests deceleration of the vehicle 1A in a period between time t11 and time t12 and a period between time t13 and time t14. Therefore, in these periods, the required engine output Pe is reduced to be equal to or smaller than the output lower-limit value PL.

As shown in FIG. 6, when the engine 11 is controlled according to the control scheme of the comparative example, the given additional power Padd is added when the required engine output Pe becomes equal to or smaller than the output lower-limit value PL. Therefore, when a difference between the output lower-limit value PL and the required engine output Pe is smaller than the additional power Padd, as in the period between time t11 and time t12, for example, the engine output power becomes larger than that before deceleration. Therefore, the number of revolutions of the engine 11 increases, and engine sound increases, irrespective of the driver's request for deceleration. Accordingly, the driver may feel uncomfortable or strange. Also, when a difference between the output lower-limit value PL and the required engine output Pe is larger than the additional power Padd, as in the period between time t13 and time t14, the engine output power obtained by adding the additional power Padd to the required engine output Pe does not reach the output lower-limit value PL. Therefore, the engine 11 is operated in an operation region having poor thermal efficiency. Accordingly, the thermal efficiency of the engine 11 is reduced.

On the other hand, when the engine 11 is controlled according to the control scheme of the first embodiment, the engine 11 is controlled so that the engine output power becomes equal to the output lower-limit value PL in the period between time t11 and time t12 and the period between time t13 and time t14, as shown in FIG. 5. Therefore, the engine output power is reduced in the period between time t11 and time t12, so that the driver is less likely or unlikely to feel uncomfortable or strange. Then, in the period between time t13 and time t14, the output power of the engine 11 is controlled to the output lower-limit value PL, so that the engine 11 can be operated in an operating region having high thermal efficiency. Thus, the thermal efficiency of the engine 11 can be improved, and the fuel efficiency can be thus improved.

In the vehicle 1A of FIG. 1, the first MG 12 corresponds to the generator of the invention. The vehicle controller 30 functions as the controller of the invention when it executes the control routine of FIG. 4.

Figure 7:
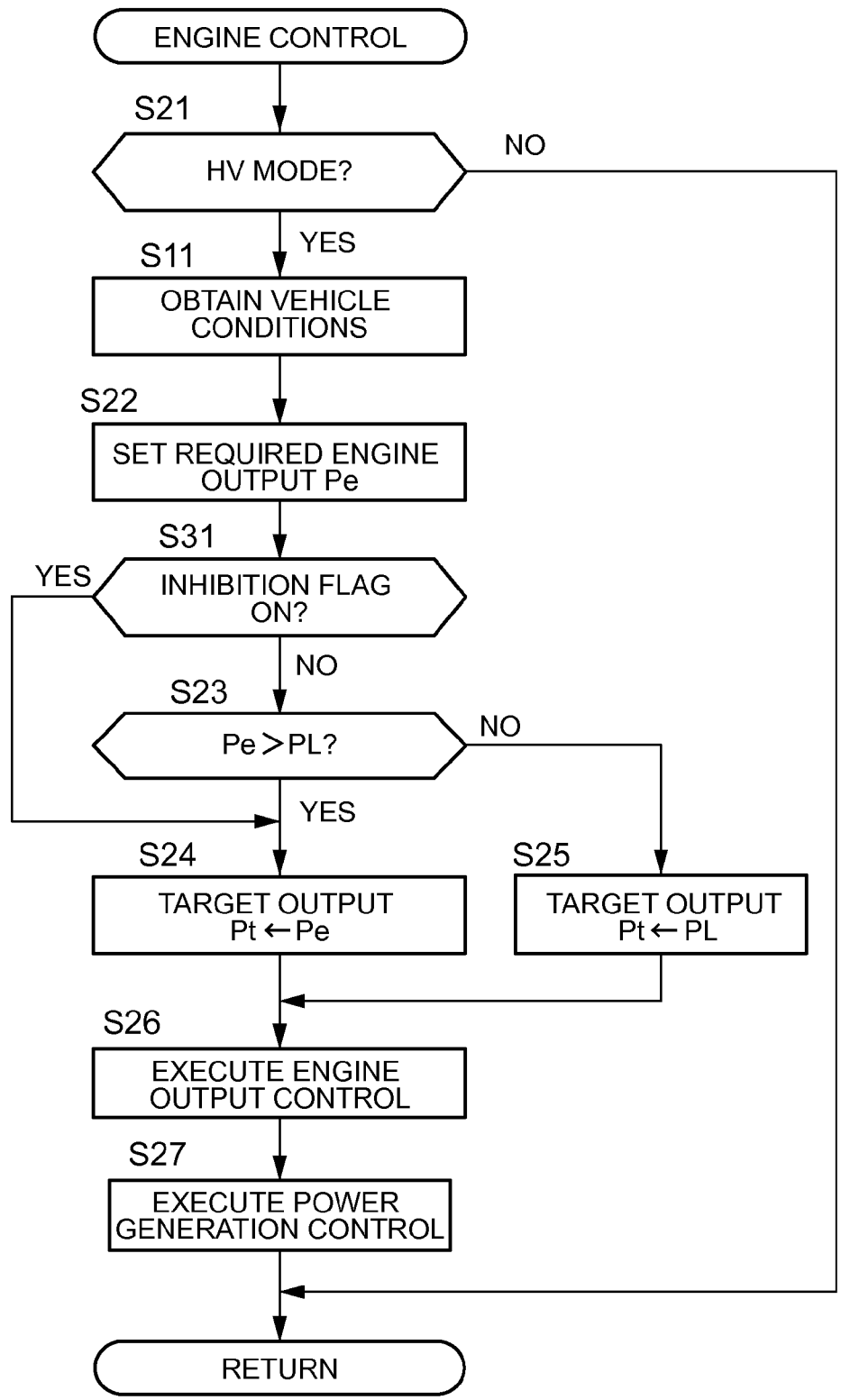
FIG. 7 is a flowchart illustrating an engine control routine executed by a vehicle controller in a control system according to a second embodiment of the invention.
Figure 8:
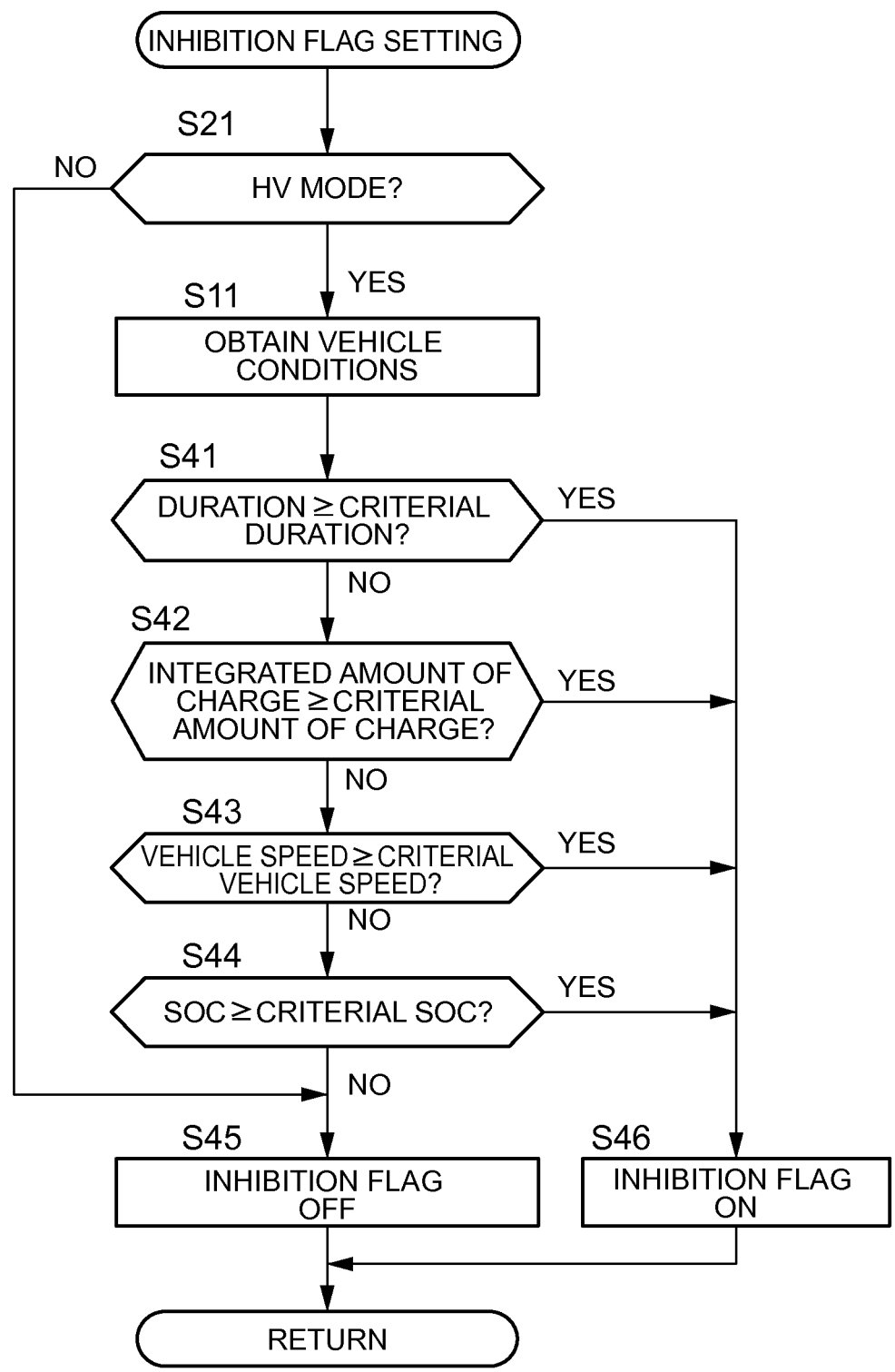
FIG. 8 is a flowchart illustrating an inhibition flag setting routine executed by the vehicle controller in the control system according to the second embodiment.
Figure 9:
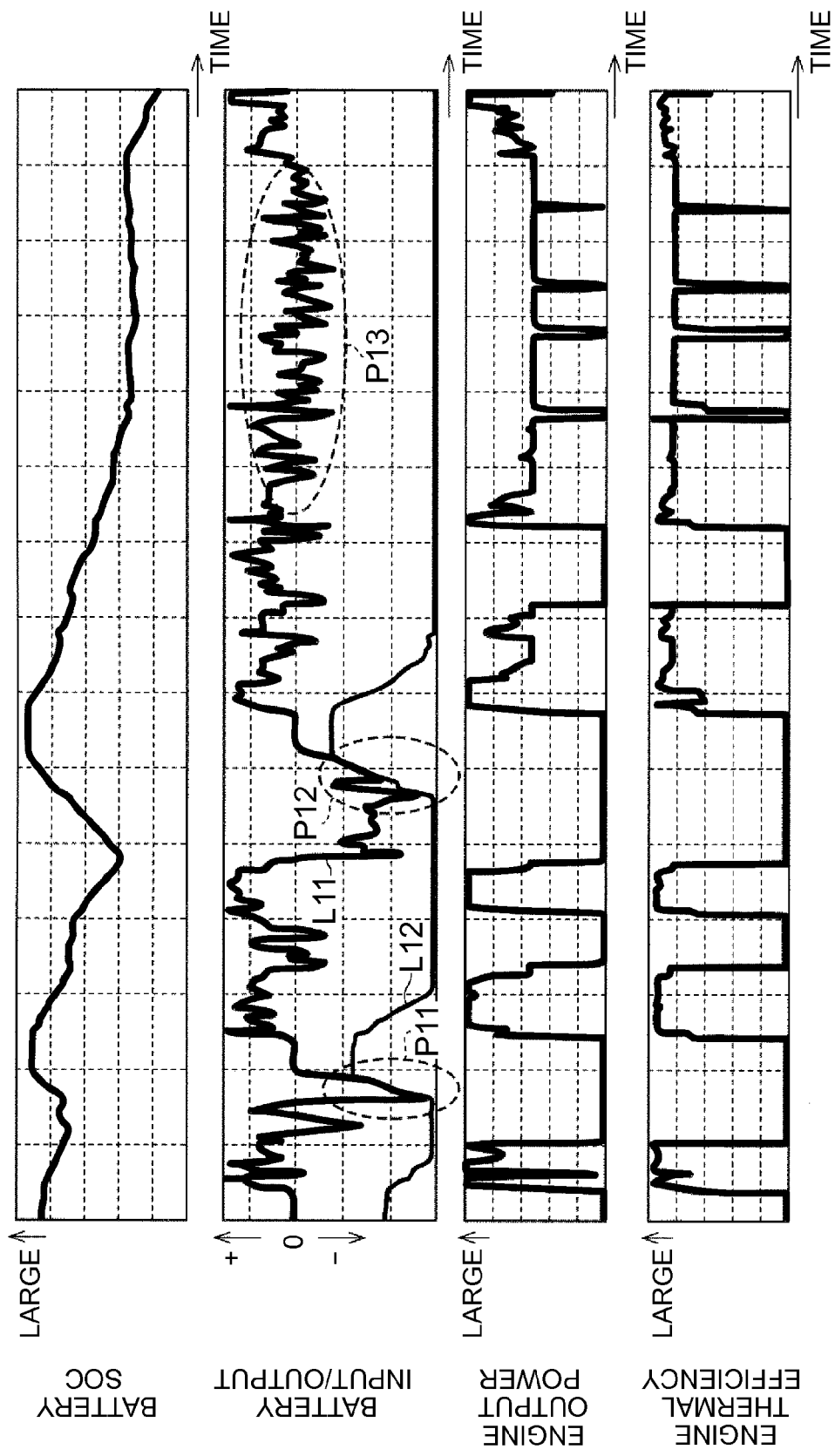
FIG. 9 is a view showing one example of changes of the SOC of a battery, input/output of the battery, output power of the engine, and the thermal efficiency of the engine with time when the engine is controlled according to the engine control routine of FIG. 7.

Referring next to FIG. 7 to FIG. 9, a control system according to a second embodiment of the invention will be described. In this embodiment, too, the vehicle 1A is constructed as shown in FIG. 1. Also, in this embodiment, too, the vehicle controller 30 executes the mode switching control routine of FIG. 3. FIG. 7 illustrates an engine control routine executed by the vehicle controller 30 in the second embodiment. The routine of FIG. 7 is different from the routine of FIG. 4 in that step S31 is provided between step S22 and step S23 of FIG. 4, but is identical with the routine of FIG. 4 in other respects. Therefore, in FIG. 7, the same reference numerals or step numbers are assigned to the same steps as those of FIG. 4, and these steps will not be further explained.

In the control routine of FIG. 7, after the required engine output Pe is set in step S22, the control proceeds to step S31, in which the vehicle controller 30 determines whether an inhibition flag is ON. The inhibition flag is set to ON so as to inhibit the target output Pt from being set to the output lower-limit value PL even if the required engine output Pe is equal to or lower than the output lower-limit value PL. The inhibition flag is set in an inhibition flag setting routine as illustrated in FIG. 8. If it is determined that the inhibition flag is OFF, the control proceeds to step S23, and executes step S23 and subsequent steps in the same manner as those of FIG. 4.

If, on the other hand, it is determined that the inhibition flag is ON, the control skips step S23, proceeds to step S24, and executes step S24 and subsequent steps in the same manner as those of FIG. 4.

The inhibition flag setting routine of FIG. 8 will be described. This routine is repeatedly executed at given intervals during running of the vehicle 1A. In this routine, the same reference numerals or step numbers are assigned to the same steps as those of FIG. 3 or FIG. 4, and these steps will not be further explained.

In the routine of FIG. 8, the vehicle controller 30 initially determines in step S21 whether the running mode of the vehicle 1A is the HV mode. If it is determined that the running mode is the EV mode, the control skips step S11 and steps S41-S44, and proceeds to step S45. If, on the other hand, it is determined that the running mode is the HV mode, the control proceeds to step S11, in which the vehicle controller 30 obtains conditions of the vehicle 1A. In the next step S41, the vehicle controller 30 determines whether a period of time (which may be called "duration") for which the engine 11 is continuously operated to generate the output power of the output lower-limit value PL is equal to or longer than a predetermined criterial duration. The duration may be counted in step S26 of FIG. 7, for example. Then, the count may be reset to zero when the required engine output Pe becomes larger than the lower-limit value, or when the engine 11 is stopped. A known method may be used as a method of counting the duration, and therefore, the counting method will not be described in detail. The criterial duration may be set as appropriate according to the specifications of the battery 15, for example. As known in the art, if the battery 15 is continuously charged for a long time, deterioration of the battery 15 is accelerated. Thus, the criterial duration is set to a length of time within which deterioration of the battery 15 can be suppressed, for example.

If it is determined that the duration is shorter than the criterial duration, the control proceeds to step S42, in which the vehicle controller 30 determines whether the integrated amount of charge is equal to or larger than a predetermined criterial amount of charge. The integrated amount of charge is an integral value of the amount of charge, i.e., the amount of electric power with which the battery 15 has been charged since the required vehicle output Pv becomes equal to or larger than the start threshold value Psta. The integrated amount of charge may be calculated based on the amount of electric power with which the battery 15 is charged in step S27 of FIG. 7, for example. Then, the integrated amount of charge may be reset to zero when the engine 11 is stopped, for example. A known method may be used as a method of calculating the integrated amount of charge, and therefore, the calculating method will not be described in detail. The criterial amount of charge may be set as appropriate according to the specifications of the battery 15, for example. As known in the art, if the battery 15 is excessively charged, deterioration of the battery 15 is accelerated. Thus, the criterial amount of charge is set to an integrated amount of charge with which deterioration of the battery 15 can be suppressed, for example.

If it is determined that the integrated amount of charge is smaller than the criterial amount of charge, the control proceeds to step S43, in which the vehicle controller 30 determines whether the vehicle speed is equal to or higher than a predetermined criterial vehicle speed. As described above, in the vehicle 1A, the second MG 13 generates electric power through regenerative braking when the vehicle 1A is decelerated. As known in the art, as the vehicle speed increases, the amount of electric energy generated by regenerative power generation during deceleration increases. Therefore, the battery 15 may be excessively charged. Thus, the criterial vehicle speed is set to a vehicle speed at or below which the battery 15 can be prevented from being excessively charged during regenerative power generation, for example. The criterial vehicle speed may be set as appropriate according to the capacity of the battery 15, for example.

If it is determined that the vehicle speed is lower than the criterial vehicle speed, the control proceeds to step S44, in which the vehicle controller 30 determines whether the SOC of the battery 15 is equal to or higher than a predetermined criterial SOC. If the SOC of the battery 15 is too high, the battery 15 may be excessively charged through regenerative power generation during deceleration. Thus, the criterial SOC is set to an SOC level at or below which the battery 15 can be prevented from being excessively charged during regenerative power generation, for example. The SOC level may be set as appropriate according to the capacity of the battery 15, for example.

If it is determined that the SOC of the battery 15 is lower than the criterial SOC, the control proceeds to step S45, in which the vehicle controller 30 sets the inhibition flag to OFF. Then, the current cycle of the control routine ends.

On the other hand, if it is determined in step S41 that the duration is equal to or longer than the criterial duration, or it is determined in step S42 that the integrated amount of charge is equal to or larger than the criterial amount of charge, or it is determined in step S43 that the vehicle speed is equal to or higher than the criterial vehicle speed, or it is determined in step S44 that the SOC of the battery 15 is equal to or higher than the criterial SOC, the control proceeds to step S46, in which the vehicle controller 30 sets the inhibition flag to ON. Then, the current cycle of this routine ends.

FIG. 9 shows one example of changes of the SOC of the battery 15, the input/output of the battery 15, the output power of the engine 11, and the thermal efficiency of the engine 11, with time when the engine 11 is controlled according to the routines as shown in FIG. 7 and FIG. 8. Regarding the input/output of the battery 15, the positive sign (+) indicates charge (input) of electric power into the battery 15, and the negative sign (−) indicates discharge (output) of electric power from the battery 15. Also, solid line L11 indicates changes of the input/output of the battery 15 with time, and solid line L12 indicates changes of the input of power into the battery 15. In the example shown in FIG. 9, the SOC of the battery 15 becomes equal to or larger than the criterial SOC in the periods P11, P12 circled with broken lines, so that the output power of the engine 11 is made substantially equal to zero. Also, in the period P13 circled with a broken line, the duration becomes equal to or longer than the criterial duration, or the integrated amount of charge becomes equal to or larger than the criterial amount of charge, so that the output power of the engine 11 is temporarily made substantially equal to zero several times.

As explained above, in the second embodiment, when the duration becomes equal to or longer than the criterial duration, or the integrated amount of charge becomes equal to or larger than the criterial amount of charge, the target output Pt is inhibited from being set to the output lower-limit value PL even if the required engine output Pe is equal to or smaller than the output lower-limit value PL. Therefore, deterioration of the battery 15 can be suppressed. Also, when the vehicle speed becomes equal to or higher than the criterial vehicle speed, or the SOC of the battery 15 becomes equal to or higher than the criterial SOC, too, the target output Pt is inhibited from being set to the output lower-limit value PL; therefore, deterioration of the battery 15 can be further suppressed.

In the example shown in FIG. 8, all of the duration, the integrated amount of charge, the vehicle speed, and the SOC of the battery 15 are used for determining whether the target output Pt is inhibited from being set to the output lower-limit value PL. However, at least one of these parameters may be used for making this determination. Namely, only step S41 may be used to determine whether the above setting is inhibited, or only step S42 may be used to determine whether the setting is inhibited. Furthermore, two or more of these parameters may be combined as appropriate to determine whether the same setting is inhibited.

The vehicle controller 30 functions as the time-based inhibiting unit of the invention when it executes step S41 of FIG. 8 and step S31 of FIG. 7. Also, the vehicle controller 30 functions as the charge-amount-based inhibiting unit of the invention when it executes step S42 of FIG. 8 and step S31 of FIG. 7.

Figure 10:
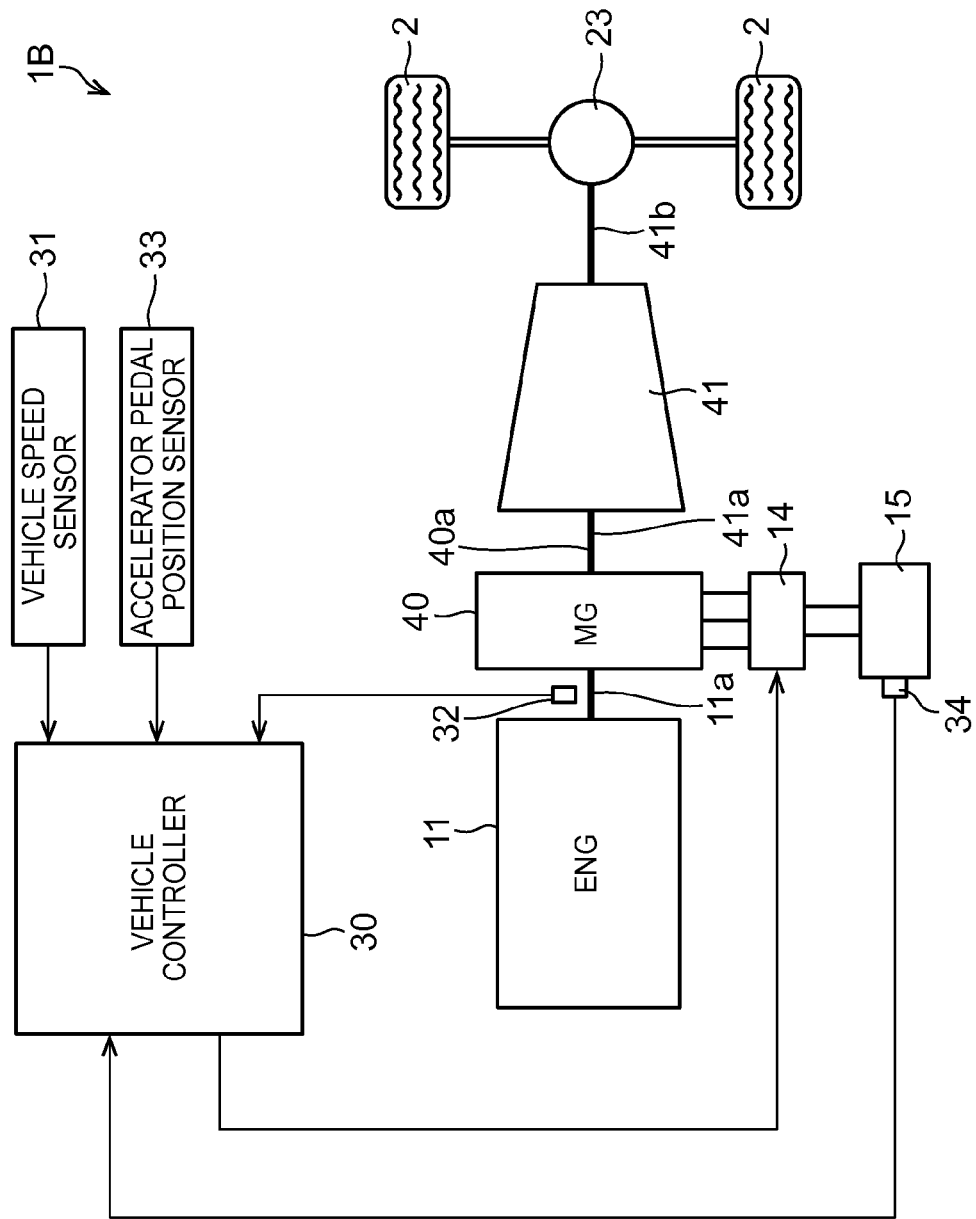
FIG. 10 is a view schematically showing another example of hybrid vehicle in which the control system of the first embodiment or second embodiment of the invention may be employed.

The invention is not limited to each of the above-described embodiments, but may be embodied in various forms. For example, the vehicle in which the control system of the invention is incorporated is not limited to the vehicle 1A as shown in FIG. 1. For example, the invention may be applied to a hybrid vehicle 1B as shown in FIG. 10. In FIG. 10, the same reference numerals are assigned to portions or elements in common with FIG. 1. The vehicle 1B includes the engine 11 and one motor-generator 40 as power sources for running the vehicle. As shown in FIG. 10, the crankshaft 11a as the output shaft of the engine 11 is connected to an output shaft 40a of the motor-generator 40. The output shaft 40a of the motor-generator 40 is connected to an input shaft 41a of a transmission 41. As the transmission 41, a known automatic transmission or a known continuously variable transmission is provided, for example. An output shaft 41b of the transmission 41 is connected to the differential mechanism 23. In the vehicle 1B, the drive wheels 2 may be driven by the engine 11. Also, the engine 11 may be stopped, and the drive wheels 2 may be driven only by the motor-generator 40.

With the control of each of the above-described embodiments applied to the vehicle 1B constructed as described above, the engine 11 is prevented from being operated in an operating region having poor thermal efficiency. Therefore, the thermal efficiency of the engine 11 can be improved. Accordingly, the fuel economy can be improved.

While the output lower-limit value PL is set to the start threshold value Psta in each of the above-described embodiments, the output power set as the output lower-limit value PL is not limited to this value (Psta). For example, the output lower-limit value PL may be set to an appropriate value, based on the start threshold value Psta used when the required vehicle output Pv becomes equal to or larger than the start threshold value Psta. For example, the output lower-limit value PL may be set to output power that is slightly smaller than the start threshold value Psta. Also, the output lower-limit value PL may be set in advance to appropriate output power that is larger than the stop threshold value Pstp so that the engine 11 can be operated in an operating region having high thermal efficiency.

In each of the above-described embodiments, when the required vehicle output Pv is smaller than the start threshold value Psta, the output power of the engine 11 is controlled to the output lower-limit value PL. However, the output power of the engine 11 at this time is not limited to the output lower-limit value PL. For example, the engine 11 may be controlled so that the output power of the engine 11 becomes equal to a value that is slightly larger than the output lower-limit value PL.

Further, when the start threshold value Psta varies according to the vehicle speed, etc., the output lower-limit value PL may be varied according to the vehicle speed. For example, when the start threshold value Psta becomes larger as the vehicle speed increases, the output lower-limit value PL may be changed according to the vehicle speed so that the output lower-limit value PL increases as the vehicle speed increases, during a period from the time when the required vehicle output Pv becomes equal to or larger than the start threshold value Psta to the time when the required vehicle output Pv becomes equal to or smaller than the stop threshold value Pstp. However, in this case, too, the output lower-limit value PL is not changed to a value that is smaller than the start threshold value Psta at the time when the required vehicle output Pv becomes equal to or larger than the start threshold value Psta, namely, when the running mode is switched to the HV mode. As a result, the output power that is equal to or larger than the start threshold value Psta at the time when the running mode is switched to the HV mode is generated from the engine 11, during the period from the time when the required vehicle output Pv becomes equal to or larger than the start threshold value Psta, to the time when the required vehicle output Pv becomes equal to or smaller than the stop threshold value Pstp. Therefore, the engine 11 is prevented from being operated in an operating region having poor thermal efficiency.

The internal combustion engine of the vehicle to which the invention is applied is not limited to the spark-ignition engine, but may be a diesel engine. While the single-pinion type planetary gear train is used as the power split device in each of the above-described embodiments, a double-pinion type planetary gear train may be used as the power split device.

What is claimed is:

1. A control system of a vehicle, the vehicle including an internal combustion engine and a motor-generator as power sources for running the vehicle, and the motor-generator or a generator connected to an output shaft of the internal combustion engine such that power of the motor-generator or the generator can be transmitted to the output shaft, the control system comprising:
   a controller configured to:
   i) start the internal combustion engine when required vehicle output as output power required of the vehicle becomes equal to or larger than a predetermined start threshold value,
   ii) stop the internal combustion engine when the required vehicle output becomes equal to or smaller than a predetermined stop threshold value that is smaller than the predetermined start threshold value,
   iii) cause the internal combustion engine to generate output power that is equal to or larger than a predetermined output lower-limit value from the internal combustion engine,
       during a period from a time when the required vehicle output becomes equal to or larger than the predetermined start threshold value, to a time when the required vehicle output becomes equal to or smaller than the predetermined stop threshold value,
       the predetermined output lower-limit value being output power that is larger than the predetermined stop threshold value,
   iv) cause the motor-generator or the generator to consume output power for power generation by the motor-generator or the generator so as to charge a battery, the consumed output power corresponding to a difference between the required vehicle output and the predetermined output lower-limit value, when
the controller causes the internal combustion engine to generate the output power that becomes substantially equal to the predetermined output lower-limit value and the required vehicle output is smaller than the predetermined start threshold value,
during the period from the time when the required vehicle output becomes equal to or larger than the predetermined start threshold value, to the time when the required vehicle output becomes equal to or smaller than the predetermined stop threshold value, and
v) when the required vehicle output is smaller than the predetermined start threshold value and a length of time over which the internal combustion engine is continuously operated so as to generate output power becomes equal to or longer than a predetermined criterion time, the output power being equal to or larger than the predetermined output lower-limit value,
  a) inhibit the controller from causing the internal combustion engine to generate output power that is equal to or larger than the predetermined output lower-limit value from the internal combustion engine, during the period from the time when the required vehicle output becomes equal to or larger than the predetermined start threshold value, to the time when the required vehicle output becomes equal to or smaller than the predetermined stop threshold value, and
  b) control the internal combustion engine so as to operate the internal combustion engine based on the required vehicle output.

2. The control system according to claim 1, wherein the controller is configured to set the predetermined output lower-limit value, based on the predetermined start threshold value used when the required vehicle output becomes equal to or larger than the predetermined start threshold value.

3. The control system according to claim 1, wherein the controller is configured to set the predetermined output lower-limit value to the predetermined start threshold value used when the required vehicle output becomes equal to or larger than the predetermined start threshold value.

4. The control system according to claim 1, wherein the controller is configured to cause the internal combustion engine to generate the power that becomes substantially equal to the predetermined output lower-limit value when the required vehicle output is smaller than the predetermined start threshold value, during the period from the time when the required vehicle output becomes equal to or larger than the predetermined start threshold value, to the time when the required vehicle output becomes equal to or smaller than the predetermined stop threshold value.

5. The control system according to claim 1, wherein the controller is configured to, when the required vehicle output is smaller than the predetermined start threshold value and an integrated value of an amount of electric power with which the battery is charged becomes equal to or larger than the predetermined criterion amount of charge while the internal combustion engine is operated so as to generate output power that is equal to or larger than the predetermined output lower-limit value,
  i) inhibit the controller from causing the internal combustion engine to generate output power that is equal to or larger than the predetermined output lower-limit value from the internal combustion engine, during the period from the time when the required vehicle output becomes equal to or larger than the predetermined start threshold value, to the time when the required vehicle output becomes equal to or smaller than the predetermined stop threshold value, and
  ii) control the internal combustion engine so as to operate the internal combustion engine based on the required vehicle output.

* * * * *